United States Patent
Cai et al.

(10) Patent No.: US 6,631,474 B1
(45) Date of Patent: Oct. 7, 2003

(54) SYSTEM TO COORDINATE SWITCHING BETWEEN FIRST AND SECOND PROCESSORS AND TO COORDINATE CACHE COHERENCY BETWEEN FIRST AND SECOND PROCESSORS DURING SWITCHING

(75) Inventors: Zhong-Ning George Cai, Portland, OR (US); Tosaku Nakanishi, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,038

(22) Filed: Dec. 31, 1999

(51) Int. Cl.[7] .............................. G06F 1/26; G06F 1/32
(52) U.S. Cl. ...................... 713/300; 713/320; 713/324
(58) Field of Search ................................ 713/300, 320, 713/324, 323; 711/141; 712/1

(56) References Cited

U.S. PATENT DOCUMENTS

| | | | | |
|---|---|---|---|---|
| 5,228,136 A | * | 7/1993 | Shimizu et al. ............. | 711/141 |
| 5,303,364 A | * | 4/1994 | Mayer et al. ............... | 711/140 |
| 5,485,594 A | * | 1/1996 | Foster .......................... | 711/1 |
| 5,490,279 A | * | 2/1996 | Golbert et al. ................ | 712/1 |
| 5,526,487 A | * | 6/1996 | Schiffleger ................... | 710/1 |
| 5,841,988 A | * | 11/1998 | Chennubhotla et al. ..... | 370/462 |
| 6,035,408 A | * | 3/2000 | Huang ......................... | 713/300 |
| 6,240,521 B1 | * | 5/2001 | Barber et al. ................ | 713/323 |
| 6,263,405 B1 | * | 7/2001 | Irie et al. ..................... | 711/141 |

FOREIGN PATENT DOCUMENTS

| | | | | |
|---|---|---|---|---|
| JP | | 10161930 A | * 6/1998 | ........... G06F/12/08 |

OTHER PUBLICATIONS

IBM, Checkstop Architecture for a Multiprocessor System, Jan. 1, 1991, IBM Technical Disclosure Bulletin, Vol 33, Issue 8, pp. 321–323.*

* cited by examiner

Primary Examiner—Thomas Lee
Assistant Examiner—Suresh K Suryawanshi
(74) Attorney, Agent, or Firm—Blakely, Sokoloff, Taylor & Zafman LLP

(57) ABSTRACT

A computer system includes a first processor, a second processor, and interprocessor communication logic (ICL). The first processor operates at a higher frequency, includes a more advanced micro-architecture, and consumes more power than the second processor. When the computer system is plugged in, the first processor is selected as the primary system processor. When the computer system is powered by a battery, the second processor is selected as the primary system processor. The second processor and the ICL may be integrated together on the same semiconductor chip.

27 Claims, 3 Drawing Sheets

SYSTEM TO COORDINATE SWITCHING BETWEEN FIRST AND SECOND PROCESSORS AND TO COORDINATE CACHE COHERENCY BETWEEN FIRST AND SECOND PROCESSORS DURING SWITCHING

The present invention relates to computer systems and more particularly to a computer system that is capable of switching between a high performance mode and a low power consumption mode.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer. by executing instructions. To provide more powerful computer systems for consumers, processor designers strive to continually increase the operating speed of the processor. Unfortunately, as processor speed increases, the power consumed by the processor tends to increase as well. Historically, the power consumed by the processor, and hence its speed, has been limited by two factors. First, as power consumption increases, the processor tends to run hotter, leading to thermal dissipation problems. Second, the power consumed by a processor may tax the limits of the power supply used to keep the processor operational, reducing battery life in mobile systems and diminishing reliability while increasing cost in larger systems.

The present invention addresses this and other problems associated with the prior art.

SUMMARY OF THE INVENTION

In accordance with one embodiment of the present invention, a computer system includes first and second processors and interprocessor communication logic (ICL). The ICL coordinates switching between the first and second processors as the primary system processor of the computer system.

Other features and advantages of the present invention will be apparent from the accompanying figures and the detailed description that follows.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a computer system includes two processors. The first processor is designed to have a more advanced microarchitecture than the second processor. As a result, the first processor operates at a higher frequency than the second processor, but it consumes more power. For this reason, the first processor is referred to as a high-power processor and the second processor is referred to as a low-power processor.

The computer system may be any mobile computer system such as a laptop, notebook, sub-notebook, tablet, or personal data assistant. When the computer system is plugged in, the high-power processor operates as the primary system processor of the computer system, thereby providing the user with high performance. When the computer system is powered by the battery, however, the low-power processor operates as the primary system processor, thereby providing the user with slightly lower performance but with extended battery life. Alternatively, the user may intentionally opt to sacrifice battery life for enhanced performance by selecting a high performance mode. In this mode, the high-power processor operates as the primary system processor even when the computer system is powered by the battery.

The interprocessor communication logic (ICL) of the computer system may be manufactured using the same process technology as one or both processors, allowing the ICL to be formed together on the same semiconductor chip as the processors to construct a multiple core system. Otherwise, the ICL can be formed using a cheaper, less-advanced process technology than that used to form, for example, the high-power processor. Because the low-power processor may be manufactured using the same, less-advanced process technology, however, it may be integrated together with the ICL on the same semiconductor chip. This higher degree of integration may provide for a higher performance, less expensive system.

For an embodiment in which the system supports a multiprocessor configuration, both the high and low-power processors may operate together in a symmetric or asymmetric multiprocessor configuration.

A more detailed description of embodiments of the present invention, including various configurations and implementations, is provided below.

As used herein, the term "when" is intended to mean during all or some portion of time within the period of time that satisfies a condition, as opposed to the term "whenever" which is intended to mean during the entire period of time that satisfies the condition. For example, the statement that a particular processor operates when a computer is plugged in is intended to mean that the processor may operate during all or some portion of the period of time during which the computer is plugged in.

Figure 1:
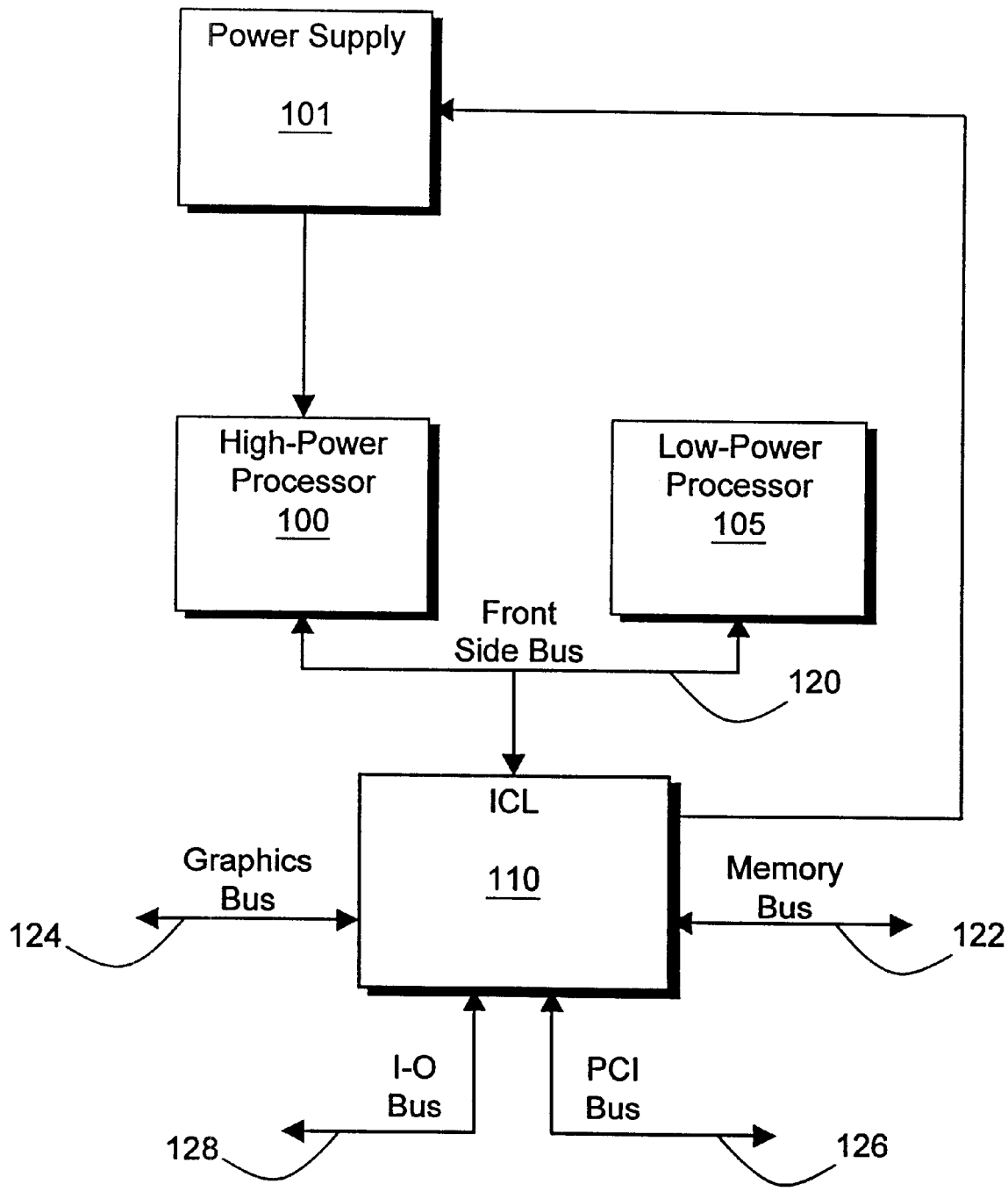
FIG. 1 is a computer system formed in accordance with an embodiment of the present invention.

FIG. 1 is a computer system formed in accordance with an embodiment of the present invention. High-power processor 100 and low-power processor 105 are coupled to ICL 110 via front side bus 120. Power is supplied to high-power processor 100 from power supply 101. Low power processor 105 may also receive power from power supply block 101. ICL 110 is coupled to power supply 101 via a signal line. For one embodiment of the present invention, both processors 100 and 105 are compatible in terms of their instruction set.

ICL 110 of FIG. 1 includes hardware to enable an interprocessor communication protocol. Additionally it may also include a graphics port coupled to graphics bus 124, which may be coupled to a graphics input or output (I-O) device or graphics accelerator. For example, graphics bus 124 may be an advanced graphics port (AGP) bus coupled to and AGP device. ICL 110 may also include an I-O port coupled to I-O bus 128, which may be coupled to various I-O devices such as a keyboard, monitor, or hard drive. ICL 110 may further include a PCI port coupled to PCI bus 126, which may be coupled to various PCI devices such as audio/video devices (e.g. a microphone, speaker, or camera). ICL 110 may additionally include a memory port coupled to memory bus 122, which may be coupled to the main memory storage devices of the computer system. ICL 110 may be formed on a single semiconductor chip, may be distributed across two or more semiconductor chips, or may be integrated with either or both the high power processor and low power processor.

As used herein, the term "ICL" describes a controller that either fully or in part coordinates communication between a processor of a computer system, and another electronic device such as another processor, memory, or an I-O device. As shown in FIG. 1, ICL 110 acts as the host controller for high and low-power processors 100 and 105. A ICL may alternatively be referred to as all or any portion of a hub, bridge, or chipset. ICL 110 arbitrates bus master requests from the processors and other bus masters in the system.

For one embodiment of the present invention, high-power processor 100 of FIG. 1 operates at a higher frequency, and includes a more advanced micro-architecture (such as deeper, wider, or additional pipelines) than low-power processor 105. For another embodiment, high-power processor 100 may additionally operate at a lower voltage than low-power processor 105, and may be manufactured using a more advanced manufacturing technology that provides for increased transistor density. As a result, high-power processor 100 may provide better performance than low-power processor 105, but high-power processor 100 may also consume more power during operation.

When the computer system of FIG. 1 is plugged in, power supply 101 is driven by an electrical outlet, providing a nearly inexhaustible supply of power. To take advantage of this power supply, the computer system operates with high-power processor 100 operating as the primary system processor.

For an embodiment in which the computer system supports a uniprocessor configuration, high and low-power processors 100 and 105 of FIG. 1 behave as a single processor in which only one processor executes instructions at any given time. For this embodiment, when high-power processor 100 operates as the primary system processor, low-power processor 105 may be placed in a low power standby mode. Alternatively, high-power processor 100 may operate as the primary system processor while low-power processor 105 operates as a co-processor. For a uniprocessor configuration in which the low-power processor is integrated with the ICL (described in more detail below in conjunction with FIG. 2), functionality of the low-power processor may be used by the ICL to provide additional capabilities or "intelligence" to the ICL when the high-power processor operates as the primary system processor.

For an alternate embodiment in which the computer system supports a multiprocessor configuration, high and low-power processors 100 and 105 of FIG. 1 may operate concurrently. For this embodiment, instructions may be executed simultaneously by both processors to, for example, execute a multithreaded program or to execute multiple programs simultaneously. The multiprocessor configuration supported by the computer system may be either asymmetrical or symmetrical. For an asymmetrical configuration, high-power processor 100 may operate as the primary system processor.

When the computer system of FIG. 1 is not plugged in, power supply 101 is driven by a battery, providing a limited supply of power. To extend the battery life, the computer system operates with low-power processor 105 operating as the primary system processor. For one embodiment of the present invention, when the computer system is powered by a battery and low-power processor 105 operates as the primary system processor, ICL 110 prevents power from being supplied to high-power processor 100 by sending a signal to power supply 101. In response to this signal, power supply 101 significantly reduces or entirely cuts off the power supplied to high-power processor 100. By eliminating the power supplied to high-power processor 100, leakage through high-power processor 100 is eliminated, thereby reducing power dissipation and extending battery life for the user. For an alternate embodiment of the present invention, when the computer system is powered by a battery, and low-power processor 105 operates as the primary system processor, high-power processor 100 is placed in a low power standby mode.

Occasionally, while operating under battery power, a user may want the computer system of FIG. 1 to provide higher performance than low-power processor 105 can deliver. Therefore, in accordance with one embodiment of the present invention, the user may select a "high performance mode" via either a software or hardware switch. In high performance mode, the computer system may operate as if the computer were plugged in (as described above) even though the computer may actually be powered by a battery. For example, high-power processor 100 may become the primary system processor in high performance mode. Although operating high-power process 100 as the primary system processor may reduce battery life, higher performance is provided to the user.

For an alternate embodiment of the present invention, high performance mode may be automatically invoked by a software routine that monitors, for example, system resource requirements, software applications, user-defined variables, processor temperature, or battery life status. In the same manner, a software routine may automatically switch the primary system processor back from the high-power processor to the low-power processor when high performance is no longer required or a predetermined processor temperature is reached.

Switching between high-power processor 100 and low-power processor 105 of FIG. 1 as the primary system processor may be coordinated by ICL 110 and may be accomplished in any number of ways. For example, consider an embodiment of the present invention in which the primary system processor is to switch from high-power processor 100 to low-power processor 105. First, high-power processor 100 stores all of its visible states including, e.g., register values) into a memory space that is accessible by low-power processor 105, such as within ICL 110 or in the main memory (not shown) coupled to memory bus 122. Then, low-power processor 105 restores these states internally, and begins executing instructions where high-power processor 105 left off. Alternatively, the visible states of high-power processor 100 may be sent directly to low-power processor 105 via front side bus 120, thereby reducing or eliminating the need to store these states in memory. A similar process may be used in reverse when the primary system processor is to switch from low-power processor 105 to high-power processor 100.

For an alternate embodiment of the present invention, the latency associated with switching between the high and low-power processors as the primary system processor of the computer system is reduced by maintaining the same states in both processors. This may be handled by the operating system or BIOS in conjunction with the ICL. For one embodiment of the present invention, primary system processor switching may be performed at any instruction boundary. For an alternate embodiment, the computer system is shut down or placed in an idle mode before primary system processor switching may occur.

High-power processor 100 and low-power processor 105 of FIG. 1 may each have their own, separate cache or multiple levels of cache. For one embodiment of the present invention, when the primary system processor is switched, the old primary system processor cache is flushed and the new primary system processor cache is invalidated. For example, on a primary system processor switch from low-power processor 105 to high-power processor 100, the cache of low-power processor 105 is flushed to main memory (or to a higher-level cache that is shared by both processors) and the cache of high-power processor 100 is invalidated. Then, when high-power processor 100 attempts to access data from its cache, there is a miss, and high-power processor 100 then reads the proper data from memory.

For an alternate embodiment of the present invention, latency associated with primary system processor switching is reduced by maintaining partial or complete cache coherency between the two processors while one is operating as the primary system processor and the other is in a standby mode. Cache coherency may be accomplished by monitoring and snooping front side bus 120 of FIG. 1. ICL 110 may coordinate this process.

Figure 2:
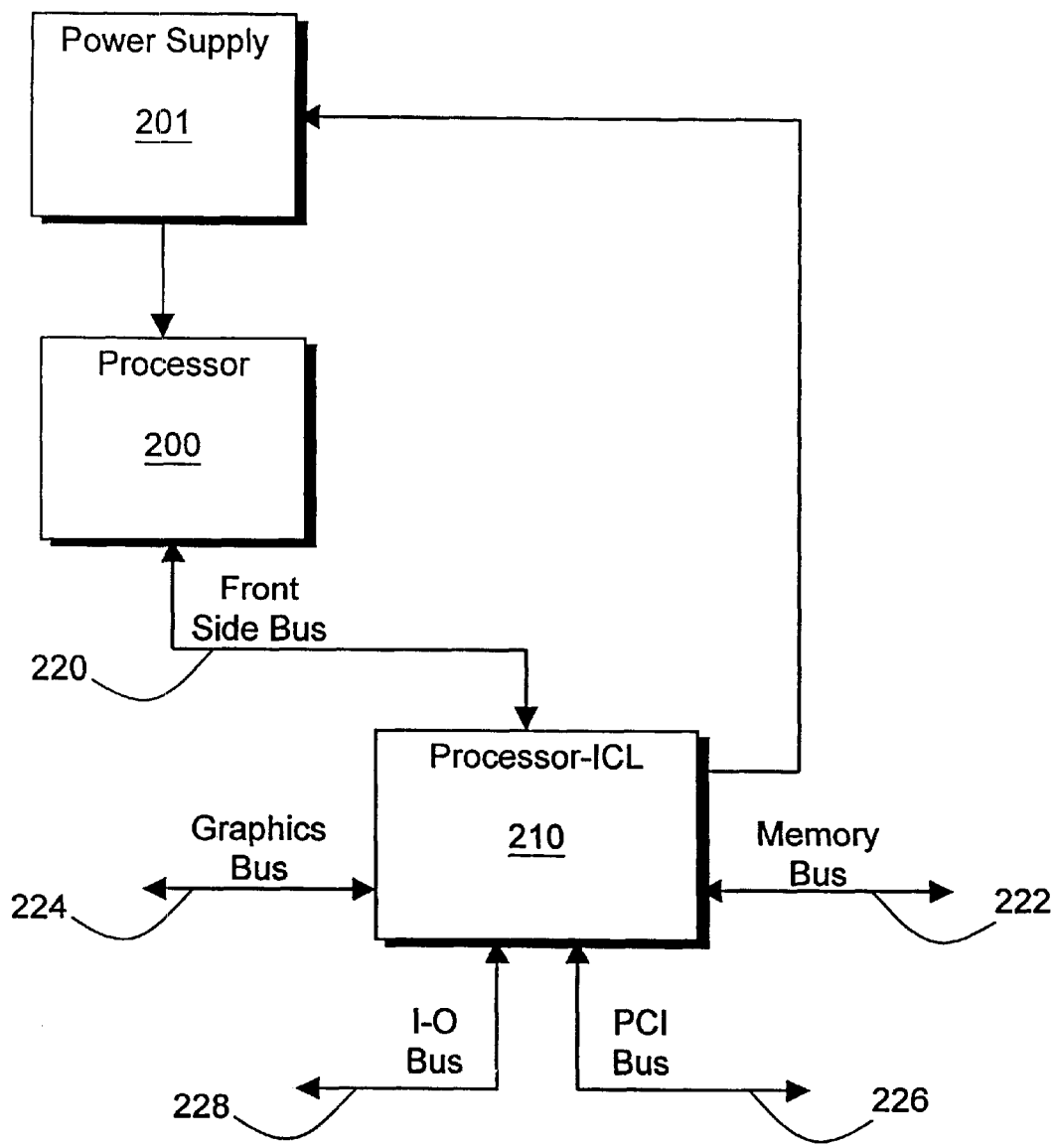
FIG. 2 is a computer system formed in accordance with another embodiment of the present invention.

FIG. 2 is a computer system formed in accordance with another embodiment of the present invention in which the low-power processor is integrated on the same semiconductor chip as the ICL to form processor-ICL 210. Processor 200 is a high-power processor coupled to processor-ICL 210 via front side bus 220. Power is supplied to high-power processor 200 from power supply 201, and processor-ICL 210 is coupled to power supply 201 via a signal line. Note that as used herein, the term processor may be used to refer to either an independent, discrete processor, or to a processor core. A processor core is a set of circuits that implement the basic functionality of a processor but which are typically integrated with other functional logic blocks on a single semiconductor chip. These other functional logic blocks may include, for example, ICL or memory components.

Processor-ICL 210 of FIG. 2 includes a low-power processor, a graphics port coupled to graphics bus 224, an I-O port coupled to I-O bus 228, a PCI port coupled to PCI bus 226, and a memory port coupled to memory bus 222. Processor-ICL 210 may be formed on a single semiconductor chip, or may be distributed across two or more semiconductor chips. For an alternate embodiment of the present invention, processor-ICL 210 may additionally include all or a portion of the main memory of the computer system, a cache, a digital signal processor, a graphics accelerator, device drivers and controllers, or electrically programmable non-volatile memory. For one embodiment of the present invention, processor-ICL is essentially a system on a chip.

The computer system of FIG. 2 operates in a similar manner as the computer system of FIG. 1, discussed above. The primary difference between the computer systems is that low-power processor 105 of FIG. 1 is absorbed into the ICL to form processor-ICL 210 of FIG. 2.

Figure 3:
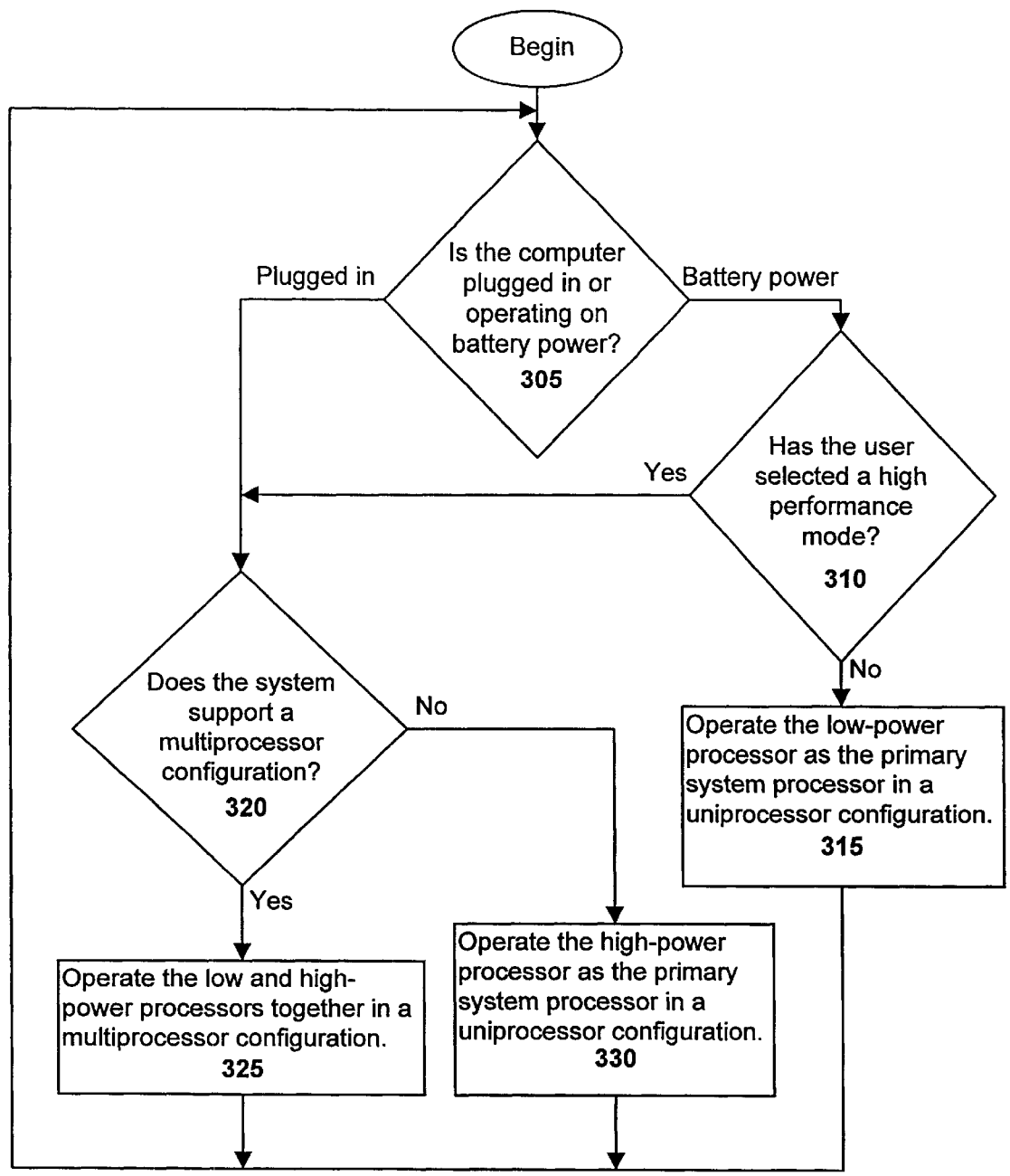
FIG. 3 is a flow chart showing a method of the present invention.

FIG. 3 is a flow chart showing a method of the present invention. As shown at step 305 it may first be determined if the computer system is plugged in or is operating on battery power. If the computer is operating on battery power, it is determined at step 310 whether or not the system user has selected a high performance mode. If a high performance mode has not been selected, then the low-power processor is operated as the primary system processor at step 315. In accordance with other embodiment of the present invention, the operation of the low-power processor as the primary system processor is done in a uniprocessor configuration. For an alternate embodiment of the present invention, the low-power processor may be operated as the primary system processor in an asymmetric multiprocessor configuration.

If, however, a high performance mode has been selected at step 310, or it is determined that the computer is plugged in at step 305, then it is determined at step 320 whether or not the system supports a multiprocessor configuration. If the system does not support a multiprocessor configuration, then the high-power processor may be operated as the primary system processor in a uniprocessor configuration at step 330. For an alternate embodiment of the present invention, the low-power processor may be selected as the primary system processor even when the computer system is plugged in. This embodiment may be useful to conserve power or for situations in which the high-power processor has overheated or is otherwise unavailable.

If it is determined that the system supports a multiprocessor configuration at step 320, then both the low and high-power processors may be operated together in a multiprocessor configuration at step 325. The process proceeds from steps 315, 325, and 330 back to the beginning of the loop at step 305 where it is again determined if the computer system is plugged in or is operating on battery power.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A computer system comprising:
   a first processor;
   a second processor; and
   interprocessor communication logic (ICL) to coordinate switching between the first and second processors as a primary system processor of the computer system and to coordinate cache coherency between the first and second processors during switching.

2. The system of claim 1, wherein the ICL is to coordinate the switching in a uniprocessor system configuration and is to coordinate cache coherency between the first and second processors in a multiprocessor system configuration.

3. The system of claim 1, wherein the first processor is to operate at a higher frequency than the second processor.

4. The system of claim 3, wherein the first processor includes a more advanced micro-architecture than the second processor.

5. The system of claim 4, wherein the first processor is manufactured using a more advanced manufacturing technology that provides for increased transistor density than the second processor.

6. The system of claim 5, wherein the second processor and ICL are integrated on a single semiconductor chip.

7. The system of claim 1, wherein the first processor is to operate at a lower voltage than the second processor.

8. The system of claim 1, wherein the ICL includes control logic to conditionally turn on or off power supplied to the first processor.

9. The system of claim 1, wherein the second processor and ICL are integrated on a single semiconductor chip.

10. The system of claim 1, wherein the system is a mobile computer system and the ICL is to select the first processor as a primary system processor when the computer system is plugged in and is to select the second processor as a primary system processor when the computer system is powered by a battery.

11. A computer system comprising:

a first processor to operate at a first frequency and having a first micro-architecture;

a second processor to operate at a second frequency and having a second micro-architecture, the first frequency being greater than the second frequency, and the first micro-architecture being more advanced than the second micro-architecture; and an ICL, integrated on a single semiconductor chip with the second processor, the ICL to select the first processor as a primary system processor during a first period of time and to select the second processor as a primary system processor during a second period of time and to coordinate cache coherency between the first and second processors during switching.

12. The system of claim 11, wherein the first period of time includes a period of time during which the computer system is plugged in, and the second period of time includes a period of time during which the computer system is powered by a battery.

13. The system of claim 12, wherein the first period of time further includes a period of time during which the computer system is powered by a battery and a user has selected a high performance mode.

14. The system of claim 12, wherein the ICL is to coordinate switching between the first and second processors as a primary system processor in a uniprocessor system configuration.

15. The system of claim 14, wherein the ICL is to prevent power from being supplied to the first processor when the second processor is selected as a primary system processor.

16. The system of claim 11, wherein the ICL is to prevent power from being supplied to the first processor when the second processor is selected as a primary system processor.

17. The system of claim 11, wherein the ICL is to coordinate switching between the first and second processors as a primary system processor in a multiprocessor system configuration.

18. The system of claim 11, wherein the first processor is to operate at a lower voltage than the second processor.

19. The system of claim 14, wherein the ICL includes a graphics port and a main memory port.

20. A method of operating a computer system comprising:

operating a first processor as a primary system processor of a computer system when the computer system is plugged in;

operating a second processor as a primary system processor of the computer system when the computer system is powered by a battery; and coordinating cache coherency between the first and second processors during switching.

21. The method of claim 20, further comprising preventing power from being supplied to the first processor when the second processor is operating as a primary system processor.

22. The method of claim 20, wherein operating the first processor as a primary system processor is done at a higher frequency than operating the second processor as a primary system processor.

23. The method of claim 22, wherein operating the first processor as a primary system processor is done at a lower voltage than operating the second processor as a primary system processor.

24. The method of claim 20, wherein operating the first processor as a primary system processor consumes more power than operating the second processor as a primary system processor.

25. The method of claim 24, further comprising operating the first processor as a primary system processor of the computer system when the computer system is powered by a battery and a user has selected a high performance mode.

26. The method of claim 24, further comprising operating the first and second processors together in a multiprocessor configuration of the computer system when the computer system is plugged in.

27. A computer readable medium having instructions stored thereon which, when executed by a computer system, cause the computer system to implement the method of claim 20.

* * * * *